US008413900B2

(12) United States Patent
Jouvin et al.

(10) Patent No.: US 8,413,900 B2
(45) Date of Patent: Apr. 9, 2013

(54) SHIPMENT TRACKING METHOD, DEVICE FOR THE IMPLEMENTATION OF THE METHOD AND PRINTING DEVICE

(76) Inventors: Frederic Jouvin, Paris (FR); Jean-luc Jouvin, Le Mans (FR)

( * ) Notice: Subject to any disclaimer, the term of this patent is extended or adjusted under 35 U.S.C. 154(b) by 0 days.

(21) Appl. No.: 13/242,460

(22) Filed: Sep. 23, 2011

(65) Prior Publication Data

US 2012/0006892 A1 Jan. 12, 2012

Related U.S. Application Data

(63) Continuation of application No. 12/891,614, filed on Sep. 27, 2010, now Pat. No. 8,047,433, which is a continuation of application No. 12/166,585, filed on Jul. 2, 2008, now Pat. No. 7,854,381, which is a continuation of application No. 11/341,137, filed on Jan. 27, 2006, now Pat. No. 7,407,098, which is a continuation of application No. 10/744,410, filed on Dec. 22, 2003, now abandoned, which is a continuation of application No. PCT/FR02/02240, filed on Jun. 27, 2002.

(30) Foreign Application Priority Data

Jun. 27, 2001 (FR) ...................................... 01 08489

(51) Int. Cl.
*G06K 9/00* (2006.01)
*G06K 5/00* (2006.01)

(52) U.S. Cl. ........................................ 235/384; 235/494

(58) Field of Classification Search .................. 235/384, 235/462.02, 462.42, 375
See application file for complete search history.

(56) References Cited

U.S. PATENT DOCUMENTS

| | | | | |
|---|---|---|---|---|
| 4,875,174 | A | 10/1989 | Olodort et al. | |
| 5,420,403 | A | 5/1995 | Allum et al. | |
| 5,602,382 | A | 2/1997 | Ulvr et al. | |
| 6,101,487 | A | 8/2000 | Yeung | |
| 6,123,263 | A | 9/2000 | Feng | |
| 6,220,509 | B1 | 4/2001 | Byford | |
| 6,826,446 | B1 | 11/2004 | Volta | |
| 6,977,353 | B1 | 12/2005 | Avant et al. | |
| 7,407,098 | B2 * | 8/2008 | Jouvin et al. | 235/384 |
| 7,854,381 | B2 * | 12/2010 | Jouvin et al. | 235/384 |

FOREIGN PATENT DOCUMENTS

| | | | |
|---|---|---|---|
| EP | 0509280 | A2 | 10/1992 |
| EP | 0654747 | A2 | 5/1995 |
| FR | 2800303 | A1 | 5/2001 |

* cited by examiner

*Primary Examiner* — Daniel Hess
(74) *Attorney, Agent, or Firm* — Westerman, Hattori, Daniels & Adrian, LLP

(57) ABSTRACT

A method for tracking shipments of a letter or package shipped by at least one shipper to an address of at least one addressee including printing a bar code on each shipment to be tracked, wherein the bar code includes at least one part for identification of the shipper of the shipment, which is invariable for each shipper, and a shipment rank identification part of each shipment, which is variable for each shipment; and a device for tracking shipments of a letter or package shipped by at least one shipper to an address of at least one addressee including at least one database having at least one user data table listing bar codes of the shipper and address information, and a data table of shipments being tracked listing each shipment by shipper.

19 Claims, 3 Drawing Sheets

SHIPMENT TRACKING METHOD, DEVICE FOR THE IMPLEMENTATION OF THE METHOD AND PRINTING DEVICE

RELATED APPLICATIONS

This application is a continuation of application Ser. No. 12/891,614 filed Sep. 27, 2010, which is a continuation of application Ser. No. 12/166,585 filed Jul. 2, 2008, now U.S. Pat. No. 7,854,381, which is a continuation of application Ser. No. 11/341,137 filed Jan. 27, 2006, now U.S. Pat. No. 7,407,098, which is a continuation of application Ser. No. 10/744,410, now abandoned, which is a continuation of Int'l Appl. No. PCT/FR02/02240, with an international filing date of Jun. 27, 2002 (WO 03/002273, published Jan. 9, 2003), which is based on French Patent Application No. 01/08489, filed June 27, 2001, each of which is hereby incorporated by reference herein in its entirety.

This invention pertains to the field of shipment tracking procedures operated by shipment carriers and delivery agents. The invention more particularly pertains to a method for tracking shipments of letters or packages shipped by at least one shipper to an address of at least one addressee.

BACKGROUND

Already known in the prior art are shipment tracking methods and notably mail tracking methods based on bar codes. FR 2 715 333 pertains to a printing method for postal envelopes, and more precisely the printing of the final destination of a postal envelope by means of a bar code. Also known is WO 96/13803 which pertains to a method for labeling mail with bar codes with each bar code having at least four parts. Two different parts indicate the beginning and the end of the code. A content indicator, which follows the beginning bars, indicates the structure and the length of the following data field so that it will be read correctly. The data field can contain a postal code, with or without address information, information on the client, etc.

Use of bar codes is also known in the field of shipping and transport for identification of a shipment. This technique is based on the assignment of a bar code to a shipment and an association of the bar code with the shipment by a database. Reading the bar code at different sites as the shipment advances makes it possible to track the advancement of the shipment. Part of the information relative to the advancement of the shipment is made available to the shipper in a database that it can consult.

A major disadvantage of this technique is that it requires a very large number of bar codes to allow identification of each shipment.

Furthermore, since assignment of bar codes to the shipments is made in a random manner, it is necessary to have available a very large database permanently containing all of the possible bar codes according to the desired configuration and powerful data processing means, which limits the use of the technique to valuable shipments, i.e., essentially packages and registered mail.

SUMMARY OF THE INVENTION

This invention relates to a method for tracking shipments of a letter or package shipped by at least one shipper to an address of at least one addressee including printing a bar code on each shipment to be tracked, wherein the bar code includes at least one part for identification of the shipper of the shipment, which is invariable for each shipper, and a shipment rank identification part of each shipment, which is variable for each shipment.

This invention also relates to a device for tracking shipments of a letter or package shipped by at least one shipper to an address of at least one addressee including at least one database having at least one user data table listing bar codes of the shipper and address information, and a data table of shipments being tracked listing each shipment by a shipper.

This invention further relates to a manual device for printing bar codes on shipments of a letter of package shipped by a shipper to an address of at least one addressee including a printer, wherein the printer is subdivided into at least one printing part, which is invariable for each device, for printing of a user identification part, and a variable printing part for printing shipment rank of said shipment which is variable for each shipment.

BRIEF DESCRIPTION OF THE DRAWINGS

Better comprehension of the invention will be obtained from the description below of a mode of implementation of the invention provided in a purely explanatory manner with reference to the attached figures.

DETAILED DESCRIPTION

Figure 3:
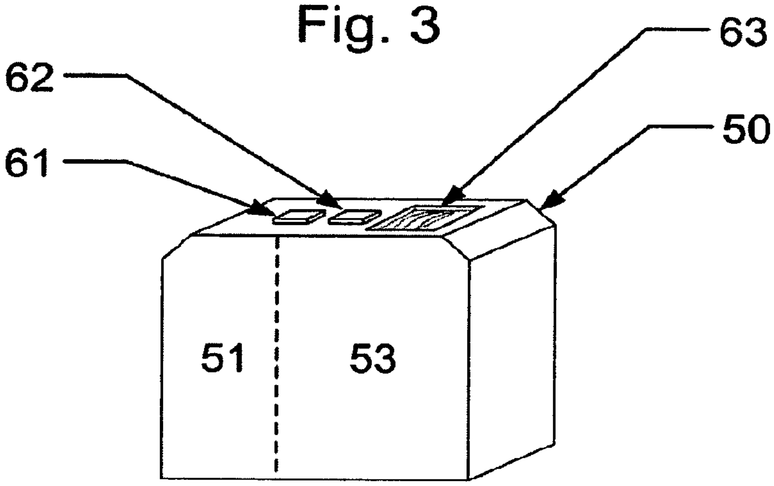
FIG. 3 illustrates a perspective view of the manual device for the printing of bar codes.

The distinctive nature of this invention is based on the structure of the bar code employed in the shipment tracking method. By means of this structure, the basic element in the database is no longer the shipment but the shipper. The shipment is identified solely by its rank for a particular shipper (for example, the fourth shipment by Mr. Y.). According to aspects of the invention, an incrementation of the base code of the shipper is made possible for each new shipment implemented by this shipper, which leads to a major modification of the memory sources employed and the data processing performed to ensure tracking of each shipment, in comparison to that which was previously required.

According to this method, the bar code is constituted at least in part by the identification of the shipper of the shipment, which is invariable for each shipper, and in part by identification of the shipment rank of the shipment, which is variable for each shipment. Operations are preferably performed in advance by registration in a database of the coordinates of the shipper and the identification part of the shipper in a table of shipper data. Operations are also preferably performed such that prior to shipping each shipment there is a registration in a tracked shipment database of the part of the shipping rank identification, as well as the shipper identification part. The bar code, moreover, preferably comprises a service option command part which is variable.

Operations are preferably implemented such that prior to the shipping of a shipment there is a registration in a shipment data table of tracked shipments of the service option command part. The service option command part preferably makes possible requesting transmission of a shipment receipt confirmation. The service option command part preferably makes possible requesting transmission of a confirmation of shipment of the shipment.

The transmission of a confirmation of drop off and/or transmission of a confirmation of receipt is/are preferably implemented by the transmission of at least one written message and/or by the transmission of at least one electronic message on a receiver means of the fixed or portable computer type or cellular telephone linked to a telecommunication network.

The shipper identification part makes it possible to command a transmission of notification of an erroneous addressee address. The shipper is, moreover, preferably given the possibility of responding to the notification of an erroneous address by providing a new address for the addressee. The shipper identification part is registered by means of a database server which can be accessed by all authorized personnel. The server preferably operates automatically in terms of transmitting confirmation(s) of drop-off or receipt, or erroneous address notifications. Operations are preferably implemented by reading the bar codes, at least during the drop off of the shipment at a forwarding agent or during the sending of the shipment to the addressee.

The present invention provides a noteworthy variant of implementation when both the shipper and the addressee are users of the shipment tracking method according to the invention. In this variant, it is verified, preferably by reading the addressee user identification part prior to submission of the shipment, that the identification part identifying the mailbox is validly that of the addressee of the shipment. The confirmation of receipt transmitted to the shipper user preferably comprises at least part of the address of the user addressee. The user addressee is preferably informed of the receipt of the shipment in a shipment submission mailbox by an identification part which is personal to him, by the transmission of at least one electronic message on a receiver means of fixed or portable computer type or cellular telephone linked to a telecommunication network. Moreover, there is preferably operated a statistical tracking of the shipment and/or receipt of the shipment by at least one user by means of the identification part.

The invention also pertains to a device for implementation of the method. The device preferably comprises at least one database having at least one table of user data, listing the bar codes of the users as well as their addresses and a data table of shipments presently being tracked, listing each shipment by user. The device, moreover, preferably comprises a database server for registration of the addresses of the users, allowing their modification and registration of information relative to the reading of bar codes.

The present invention also pertains to a manual device for printing bar codes on letter or package shipments sent by a shipper to an address of at least one addressee, the device comprising printing means, remarkable in that the printing means are comprised of at least one invariable printing part for the device, for printing a shipper identification part, and of a variable printing part for the printing of a shipping rank identification of the shipment which is variable for each shipment.

The device preferably comprises means for the automatic incrementation of the shipment rank of x unit(s), x being a whole number preferably equal to 1. The device also preferably comprises a means for displaying the shipment rank of the shipment in alphanumeric form. Because of the incrementation bar code structure, the database responsible for listing the shipments is advantageously much simpler because the basic element is the user and not the shipment. It is, therefore, possible to list a much larger number of shipments with greatly reduced means compared to the past.

Also advantageously, it is possible to provide a tracking service of the advancement of shipments which can be used for simple everyday letters which the shipper wants to be certain arrived at their destination.

Also advantageously, the invention relieves the user of the responsibility of writing its address on the shipment because the simple reading of the bar code with a suitable scanner linked to the server by the management and tracking device enables identification of the user. Moreover, this means that third parties cannot identify the name of the user of a shipment if these third parties do not have access to the management and tracking device. The security of the shipments is thereby increased.

Still advantageously, the structure of the bar code can include options regarding the receipt of a confirmation of drop off, of a confirmation of receipt or of a notification of erroneous shipping address on all available means, i.e., by paper message delivered to the shipper's address, or by fax, telex, telegram, or by electronic message to an electronic address on a fixed or portable computer or on a cellular phone, etc., by means of a telecommunication network such as the Internet. Moreover, it is possible to provide for automatic printing of the user's address in the case of return of the mail to the user.

Also advantageously, by means of the method of the invention, it is not necessary for the user to call up a particular service or to connect with a particular telecommunication site; the information concerning its shipment and its tracking are automatically sent to the site where it specified its desire to send the information by means of the bar code.

Also advantageously, when the sender of the shipment and the addressee are both users of the method of the invention and, thus, both have at least an identification part which is specific to them, the invention makes it possible to:

- ensure to the delivery services that the user to whom the shipment will be given is in fact the addressee of the shipment by checking the identification of the addressee prior to dropping off the shipment,
- confirm the actual receipt of the shipment from the shipper by providing information relative to the addressee stemming from the addressee verification step,
- inform the addressee of the receipt of a shipment, possibly by providing information relative to the shipper.

Turning now to the drawings, the method according to the invention is a method for tracking a multiplicity of letter or package shipments sent by at least one user to an address of at least one addressee, the method comprising a step of printing a bar code (10) on each of the shipments intended to be tracked.

The method according to the invention is characterized in that the bar code (10) is constituted at least by a part (1) identifying the user of the shipment which is invariable for each user, and by a part (3) identifying the shipment rank of the shipment which is variable for each shipment.

The shipment user identification part (1) is invariable in the sense that each part can only designate a single user who is referenced by this unique part (1). This, of course, does not prevent a user from having multiple user identification parts (1), for example, for each of the internal departments or each of the subsidiaries headquartered at the same address. In this sense, the user identification part (1) constitutes a unique identifier.

The user identification part (1) and the shipment rank identification part (3), thus, constitute two bar codes which are associated to facilitate the registration of information and to avoid any error or omission upon input. The bar code (10) has in a traditional manner an initialization part announcing the beginning of the bar code and a termination part announcing the end of the bar code.

The shipment rank identification part (3) provides an identification of the rank number of the shipment in relation to the preceding shipments. This shipment rank identification part (3) is different for each shipment, at least over a determined period of time, since it can be imagined that the shipment rank number for a particular user could be reinitialized upon a specific event such as the renewal of its subscription or the beginning of the year.

The variation of the part (3) is not performed in a random manner, but rather according to a determined order, recognized by the system for implementing the method.

Prior to implementation of the method of the invention, a registration is performed in a database of the user's data (name, address, telephone number, fax number, e-mail address, etc.) and the invariable part (1) of the user identification in a table of user data (110). This operation can be performed by reading the user identification part (1) by a bar code reader and by inputting the information.

The user identification part (1) is registered by means of a database server (130) accessible by all authorized personnel. It is possible to implement changes in the registered information such as, for example, change of address, telephone number, e-mail address and the like.

Prior to shipping each shipment that is going to be tracked, there is performed a registration in a data table of shipments being tracked (120) of the identification part (3) of the shipment rank as well as the user identification part (1). This registration is performed by reading the entire bar code (10) by a bar code scanner and by the intermediary of the server (130).

A reading of the bar code (10) is performed and there is implemented a registration at least on the server (130) of the information relative to the date, time and site of the reading, at least upon dropping off of the shipment with the forwarding service as well as upon dropping off of the shipment to the addressee.

It is obviously possible to perform reading of the bar along the entire advancement of the shipment and record each time the information relative to the date, time and site of the reading. The information registered then also preferably includes a handler code corresponding to an identifier of the person having performed the data input. The bar code (10) can moreover include a variable part (2) of service option commands.

When the bar code (10) includes such a service option command part (20), there is performed prior to the shipment of each shipment to be tracked, a registration in a shipment data tracking table (120) the service option command part (2). This registration is also implemented by reading the bar code set (10) by means of a bar code reader.

It is preferable if the shipment management and tracking device to which the bar code readers are linked can distinguish the different parts (1, 2, 3) of the bar code (10) when reading it.

The service option command part (2) allows the user to request transmission of a confirmation of receipt of the shipment and/or a conformation of shipment of the shipment. This choice is then indicated directly by the intermediary of the bar code (10) and the registration of this choice is validated directly by reading the bar code (10).

The transmission of this or these confirmation(s) of receipt or shipment is implemented by the transmission of at least a written message by letter, fax, telex, telegram and/or by transmission of an electronic message on a receiver means of the fixed or portable computer receiver or cellular telephone type by the intermediary of a telecommunication network such as the Internet.

The user identification part (1) makes it possible to very easily transmit a notification to the user of an erroneous address when it is not possible to deliver the shipment to the addressee because of an error in the address. Similarly, this transmission is implemented by transmission of at least a written message by letter, fax, telex, telegram and/or by transmission of an electronic message on a receiver means of the fixed or portable computer type or cellular telephone type by the intermediary of a telecommunication network such as the Internet.

It is possible to give the user the possibility of responding to the notification of erroneous address by responding to the written message or electronic message by providing a new address for the addressee. The server (130) automatically performs the transmission of the confirmations of receipt and/or shipment, or notifications of erroneous address. It is, therefore, not necessary for the user to perform time-consuming consultations of the information since the information is transmitted to the user as indicated when registering the user information. In fact, the user can provide for direct archiving of the received information with an optional automatic verification of the valid receipt of all of his shipments.

In a variant of the invention, the information units contained in the data table of shipments being tracked (120) for each shipment are immediately archived after registration of the dropping off of the shipment to the addressee. There is then release of the entry corresponding to the shipment that has been delivered in the data table of shipments being tracked.

In a preferred variant of the invention, the addressee is also a user of the method according to the invention and uses an identification part (1) to identify a means, such as a mailbox, in which it is desired that the shipments addressed to him be deposited. The marking of this means is performed by printing a bar code constituted of part (1), but not including either the service option command part (2) or the shipper shipment rank part (3).

This bar code is provided to it when it subscribed to the service or it printed it itself by means of the device (50) in a suitable position or by means, for example, of a computer with a suitable data program which is linked to a printer. Thus, when the addressee of the tracked shipment is also a subscriber to the mail tracking service and it has applied its self-adhesive label on its mailbox, then the delivery service can read this second bar code which makes it possible to:

- improve the precision of the information transmitted to the shipper in the confirmation of receipt of its tracked shipment;
- verify that the first and last names and bar codes appearing on the addressee's mailbox are coherent (this requires that each carrier service deliverer be equipped with a portable terminal which is connected, for example, by radio, GSM-SMS, GPRS) to the central database to obtain the first and last names and address corresponding to the bar code, or that the delivery service terminal have a copy of the database in its internal memory, which is made possible by the fact that it is only necessary to store an extract taken from the central database and pertaining only to the geographic sector or delivery service possessing this mail distribution terminal, thus making it unnecessary to store in memory the complete user database;
- verify the agreement between the addressee appearing on the tracked shipment and the first and last names appearing on the mailbox of the addressee, when that is possible, and the first and last names and addresses available at the level of the terminal for the addressee corresponding to the bar code appearing on the addressee's mailbox, thereby avoiding any risk of delivery error;

optionally notify the addressee of the arrival of a tracked shipment directly on his cellular phone via SMS or by any other transmission means selected by the addressee of the mail; and enable the delivery service to compile statistics on the mail distributed to the users who display their bar codes on their mailbox.

Figure 6:
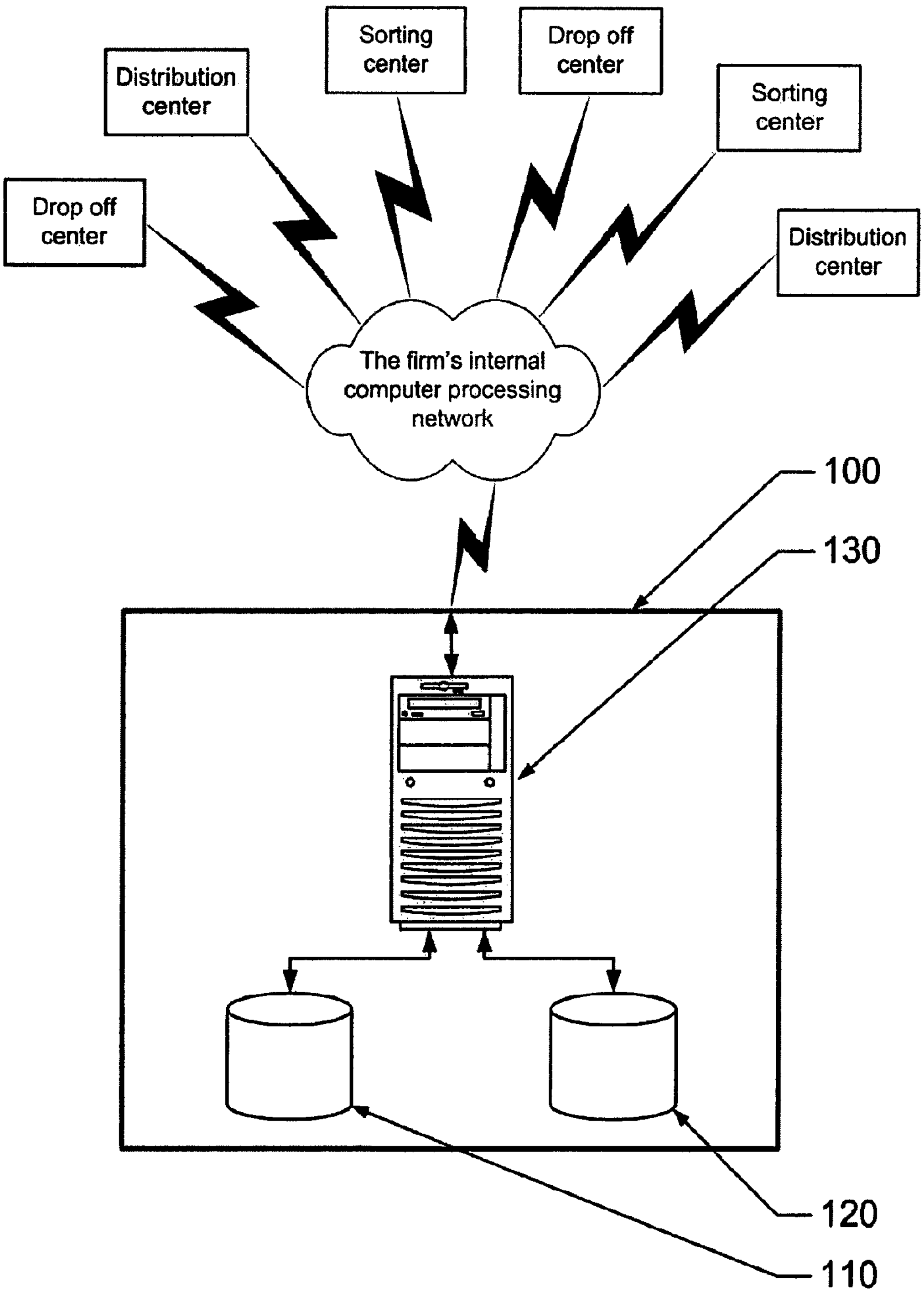
FIG. 6 illustrates a diagram of principle of the shipment tracking device according to aspects of the invention.

The device (100) enabling implementation of the method according to the invention, illustrated in FIG. 6, comprising at least one database presenting at least user data table (110) listing the bar codes of the users as well as their addresses and other information and a data table pertaining to the shipments being tracked (120) listing each shipment by user.

It furthermore comprises a database server (130) enabling registration of the user address and other information, of modification of this information and of registering information relative to the reading of bar codes (10) when dropping off a shipment, during the advancement of a shipment as well as when the shipment is delivered to the addressee. The input of the user information is preferably performed by means of a computer linked to the device (100).

The inputting of the bar code (10) can be performed with any correctly formatted bar code reader, including portable readers for the agents assigned to deliver the shipments to the addressees.

In a base version, it can be imagined that the bar codes of the shipments intended to be delivered to their addressees are input in a distribution center just before the agent assigned to deliver them has taken them for delivery and that only the bar codes of the undelivered shipments would then be input by the agent upon his return to the distribution center. The bar code inputs would thus be simplified.

In a preferred variant, when the user addressee using his identification part (1) to identify a mailbox or any similar device in which he wishes to receive shipments addressed to him, it is the reading of the addressee identification part (1) and the comparison with the information attached to it which will generate the transmission of the information relative to the receipt of the shipment at its destination first to the management system, then to the address of the shipper and/or addressee.

The bar code (10) can be printed by means of any printing device exhibiting an adequate printing quality. It is, for example, possible to provide a supplementary module that can be inserted in automatic envelope-stuffing machines to perform the printing of a bar code on each envelope. It is also possible to provide a supplementary module that can be inserted on automatic postage stamping machines. In this case the module itself implements the incrementation of the shipment ranks of each shipment and the registration of the shipment rank identification part (3) as well as the service option command part (2). It is furthermore possible to have the bar code (10) include a printing machine identification part.

Figure 5:
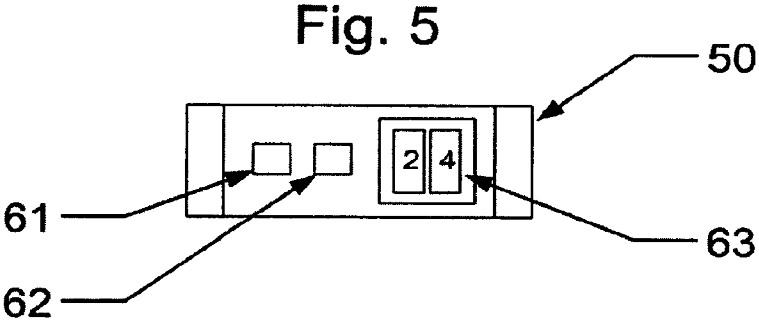
FIGS. 4 and 5 illustrate respectively a top view and a bottom view of the device of FIG. 3.
Figure 4:
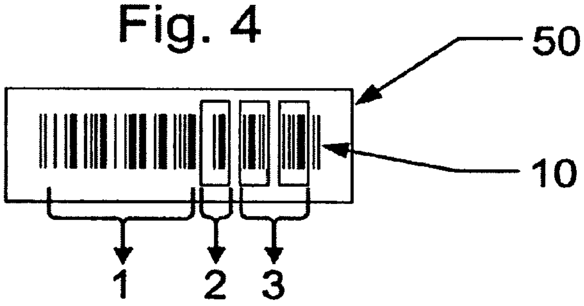
Figure 1:
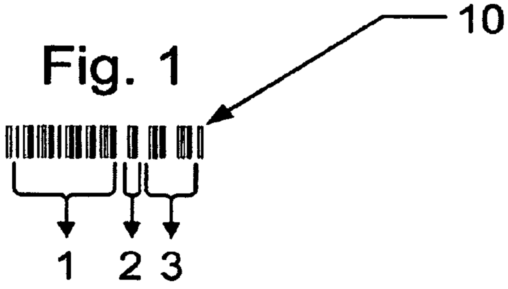
FIG. 1 illustrates a bar code according to aspects of the invention.
Figure 2:
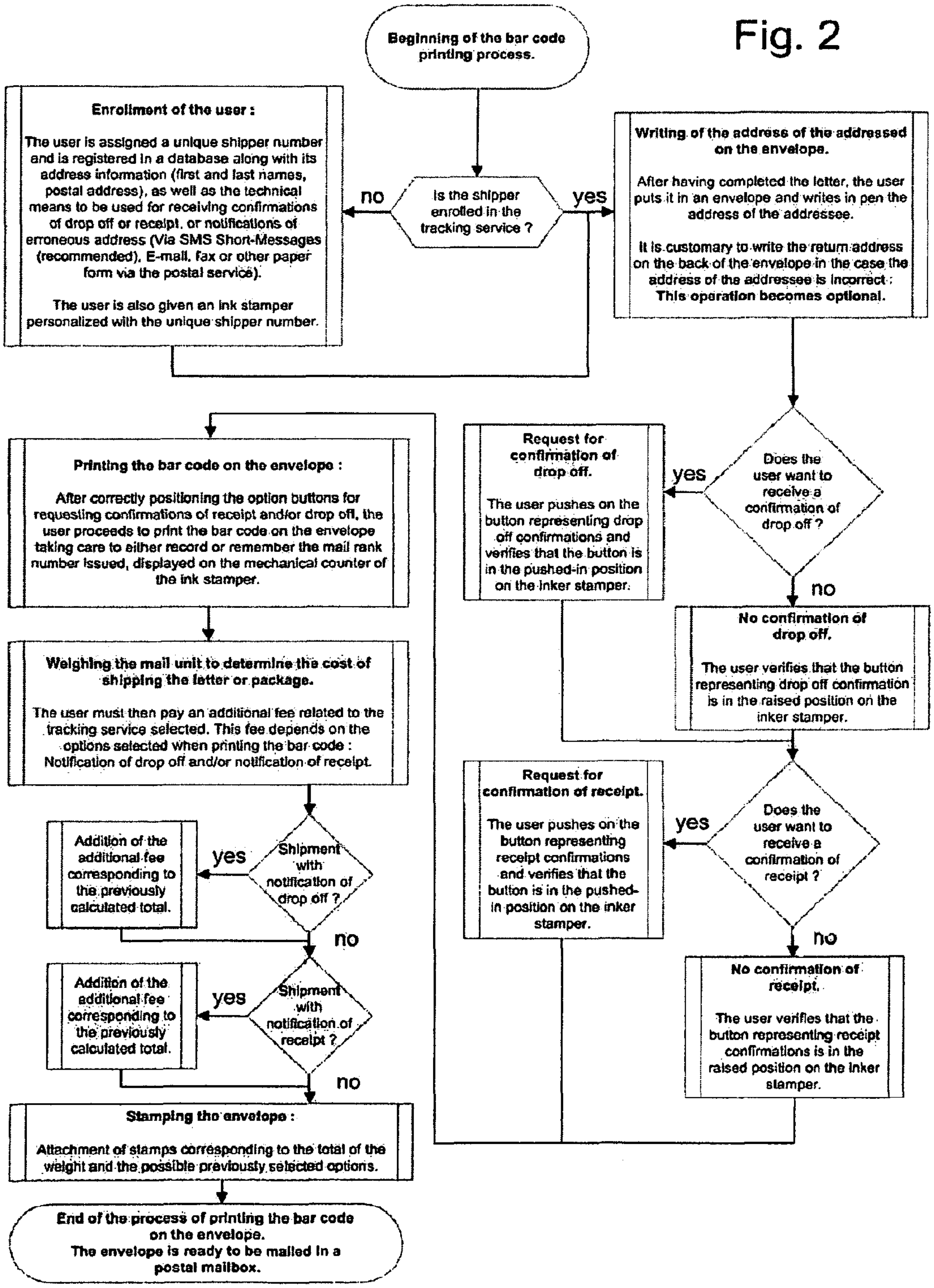
FIG. 2 illustrates a synoptic diagram of the shipment tracking method according to aspects of the invention.

In a variant of the invention, there is provided a manual, mechanical device (50) for printing the bar codes (10) on shipments of the letter or package type sent by a user to an address of at least one addressee. The device (50) illustrated in FIGS. 3 to 5 comprises printing means that can be subdivided into at least one printing part (51) that is invariable for the device (50) for the printing of a user identification part (1) and a variable printing part (53) for printing the shipment rank identification part (3) of the shipment which is variable for each shipment.

This device, thus, makes it possible for anybody, and notably private individuals, to easily print a bar code (10) on their shipment and thereby take advantage of the method of the invention. The device (50) comprises means for automatic incrementation upon each use of the device of the shipment rank of x unit(s), x being a whole number preferably equal to 1, so as to not allow the printing of two identical bar codes for two different consecutive shipments. This device is in the form of an inking stamper such as are known for printing user addresses on mail.

It comprises a stamper capable of forming the printing of the bar code (10) after manual or automatic inking, as well as a two-position button (61) for requesting transmission of a confirmation of shipment drop off, a two-position button (62) for requesting transmission of a confirmation of receipt and a means for displaying the shipment rank of the shipment in alphanumeric form by means of a shipment rank display screen (63).

The means for the incrementation of the shipment rank as well as the means for the printing of the bar code are mechanical or electronic. In a totally mechanical version, these means can be constituted, for example, by a toothed wheel or a belt per element composing the rank (units, tens, hundreds, etc.) as well as an ink stamper and an ink container.

It is also possible to create, for example, two devices having the same invariable printing part, but with the rank incrementation part advancing by two units at a time (x=2). Thus, a first device would implement the bar codes for the even number shipment ranks (3) and the second device would then implement the bar codes for the odd number shipment ranks (3).

In contrast to the majority of the existing bar code based mail tracking systems, the method of the invention is based on an identification of the user and the mail rank that it ships, which makes it possible in the data processing stage to identify uniquely all of the shipments in transit in the network of collection, transport and delivery in a simple manner and not requiring massive computer resources in relation to the amount of information processed. The method also makes it possible to easily find the information linked to the user, to allow issuance of alerts (transport errors, confirmations of dropping off, of receipt, etc.), a tracking, a management of usage reference points and an entirely automated invoicing operation.

By means of an electronic or mechanical bar code printing device, the user of the mail tracking service (the sender of the mail) himself prints on the envelope (or package) to be shipped a bar code containing three types of information:

Its unique user identifier, or one of its identifiers if it possesses several (the case, for example, of subsidiaries) constituting the user identification part (1) assigned by the distribution service.

Shipment options regarding the nature of the confirmation services that the user wishes to use (request for confirmation of drop off, request for confirmation of receipt or no options) constituting the service option command part (2).

The rank of the shipment that it ships so as to differentiate the different shipments that the same usr might ship, constituting the shipping rank identification part (3).

These three information units enable identification in a unique manner of a shipment shipped via the distribution network and enable automatic transmission of confirmations of drop off and receipt without the user having to consult an Internet site or an interactive voice mail server or a Minitel service when it has elected to receive the confirmations, for example, on its cellular telephone, which constitutes a major advance and noteworthy ease of use for the user.

With the method according to the invention, the set of processes of tracking, of issuing alerts and transmitting various confirmations, and of invoicing can be completely automated, and thus the user will not be required to log on to an information service to obtain tracking information regarding its shipments, since it this very information that will be automatically transmitted to him. Other advantages are provided by this method: the possibility of retaining specific tracking information for a given user of the set of mail trackings that it performed both as shipper and as receiver, and to enable, for example, the issuance of a monthly summary. Finally, the companies exploiting this method can perform an efficient data-mining evaluation of the mail that it sends and/or receives.

Example of Implementation of the Method:

The shipment tracking method is based on the exploitation of a database comprising ideally two principal tables. However, depending on the specific details of the service that the distributor wants to provide, other database structures can be implemented. The flexibility of the method described above, which identifies in a unique manner each piece of mail shipped allows for numerous variations.

The first table represents the table of users subscribing to or participating in the mail tracking service. This table makes it possible to recover by means of the unique user number all of the information on the user:

- First and last name.
- Complete postal address.
- The options and characteristics of its subscription:
- Use of the tracking service by payment in advance;
- By crediting its account by prepayment (virtual wallet);
- By paying individually for each piece of mail, adding to the normal stamp fees of the piece of mail related to weight and destination, surcharges corresponding to the services requested for the shipment (request for confirmation of drop off and/or receipt);
- By using a prepaid bar code printing system by means of a device that can only print a limited number of bar codes;
- By using a conventional client account with monthly invoicing of amounts and fees (more practically for firms with large volumes of shipment).

The balance of its account (for payment in advance or conventional client account).

The technical means by which the user wants to receive confirmations of drop off or receipt as shipper and/or addressee, of error for erroneous address, illegible address, etc. It is possible to envisage different technical means which can be combined:

- Transmission of confirmations by SMS Mini-Message on a cellular phone.
- Transmission of confirmations by e-mail.
- Transmission of confirmations by fax.
- Transmission of confirmations by paper receipts sent by a distribution service.

Its cellular telephone number if the user wants to receive confirmations by SMS.

Its e-mail address if the user wants to receive confirmations via e-mail.

Its fax number if the user wants to receive confirmations via fax.

If the user wants to receive a monthly summary of all of the shipments that it sent and/or received (this summary can be transmitted by paper mail and/or by e-mail and/or by fax).

Statistical information, counters and other items that need to be provided to the user.

Archival listing of the set of shipments made and tracked which can be used for the issuance for a given user of detailed invoices for use of the tracking service and the transmission of notices. Depending on needs, it is possible to store varying amounts of information on the trackings performed (dropping off date and time, rank, drop off office, weight, final destination delivery office, delivery time and date, final status, etc.).

The second table represents the table of mail items advancing through the distribution system and being tracked. This table makes possible an information system for finding information on mail items in transit, to update the information, up to the final delivery and to appropriately manage the transmission of the different notifications. Searches of and access to the information on a shipment in transit are implemented by means of a request combining the user number and the shipment rank. The following fields are furthermore included in this table:

- The unique user number.
- The shipment options (request for dropping off confirmation, request for confirmation of receipt).
- The shipment rank.
- The date of drop off (corresponding, for example, to the date on which the stamp on the mail was cancelled).
- The time of drop off (same comments as above).
- The reference of the drop off office.
- The delivery date.
- The delivery time.
- The distribution center.
- Status of the envelope:
  - Flag indicating whether the confirmation of drop off was issued.
  - Flag indicating whether the confirmation of receipt was transmitted to the shipper and/or to the addressee.
  - Flag indicating whether there was a transport error because of an error in the addressee's address.
  - Other supplementary flags can be envisaged for signaling errors, etc.
- The tracking list of the set of sorting centers through which the shipment passed:
  - Reference of the present sorting center.
  - Date of entry into the center.
  - Time of entry into the center.
  - Date of departure from the center.
  - Time of departure from the center.
  - Reference of the next sorting center to which the shipment was sent.

Scenario for the transport of a shipment with the method according to the invention and with a manual printing device:

The use of this shipment tracking service requires the user to be enrolled in advance to be assigned a unique user number as well as an ink stamper for printing the bar codes on shipments that it wants to ship.

Advance Inscription of a New User:

The user representative must go to a shipping service office and fill out a form with all of the information required for the operation of the service (in order to inform the central database of the subscribers to the tracking service):

- First and last names
- Complete postal address
- Cellular telephone number, e-mail address, fax number, etc.
- The type of subscription service (payment in advance, payment per transaction with conventional stamps, company account with monthly payments), the type of notification desired (by SMS, by e-mail, by fax, by mail, etc.).

The agent then provides the new user with a new ink stamper comprising a previously unused unique user number. The agent copies onto the form the unique user number corresponding to the stamper that has just been distributed to the new agent.

The agent then inputs in a computer-readable manner the form that has just been filled out, providing a copy to the client, as well as optionally a computer-generated summary of the data input and thereby terminates the process for the inscription of the new user.

From this moment on, the user is enrolled and can implement its first tracked mail.

Shipping of the Mail:

Prior to shipping its mail, the user must:

Write on the envelope with a pen the address of the addressee.

Set the buttons on the ink stamper for requesting drop off and/or receipt confirmations in the desired positions.

Print a bar code on the envelope using the ink stamper.

Note the shipment rank number (value of the counter on the ink stamper) which will serve as the specific reference number of this mail unit during its entire duration of transport up to its final delivery: all of the notifications and error messages relative to this mail unit that the user will receive will bear this reference number (rank number): this number, which is automatically incremented by one unit with each use of the ink stamper thus makes it possible for a given user to distinguish among the different shipment that it might make essentially at the same time.

Weigh its mail unit and stamp it, not forgetting to add the corresponding fee(s) in the case of request for a notification of drop off and/or reception.

Turn over its mail to the courier service.

Transport of the Mail:

The implementation of this new courier method does not require modification of the methods already being employed for processing and transporting mail. In contrast, a certain number of new steps, linked to the tracking method must be added:

A machine for the detection, reading and computer processing of the bar codes present on the objects using the new shipment tracking system in each of the facilities (shipping center, sorting center) where the objects shipped might be found during the shipping process.

A computer processing facility for the printing and then paper-based shipping of confirmations to clients who want to receive them in written form. This installation can also be used for the issuance and shipping of monthly summaries of use for those who request them as part of their subscription. This computer installation can also be used for the management of the invoicing for large accounts.

A computer processing facility for the management of the centralized databases operating for the implementation of the tracking method. This facility can also handle the issuance of confirmations (of drop off, of receipt, of various errors, etc.) via SMS, e-mail or fax.

Receipt of the Mail:

When the carrier agent has correctly located the addressee, it delivers the mail unit and the receipt information is transmitted to the centralized database serving for the implementation of the tracking method.

To be certain that the addressee was correctly located, if this addressee is already referenced as a user in the user database, the person assigned to deliver the mail performs the identification of the addressee by reading its bar code prior to delivering the mail unit. It then receives the confirmation or the information that the delivery can be effected.

If the Delivery is Confirmed:

The addressee is then informed, if a request has been issued for this option, of the receipt of the mail with possibly information regarding the shipper, the information means that it selected, and The shipper is then informed, if a request has been issued for this option, of the receipt of the mail unit by the addressee with possibly information regarding the addressee, the information means that it selected.

The method according to the invention also makes it possible to image that the shipping user can use this service even if it is not in a position to print bar codes itself, for example, when its manual device is not available, simply by going to a shipping center and providing its identity. The shipping agent can then perform the printing of a bar coding presenting, for example, a rank equal to a hundredfold increase, or increased by a thousand of those last used by the user or alternatively preceded by a letter such as “S” to indicate “sans tampon-encreur” [without ink stamper].

The invention was described above as an example. It is understood that it is possible to implement different variants of the invention without going beyond the scope of the patent.

The invention claimed is:

1. A method for tracking each shipment of a group of shipments of a letter or package shipped by a shipper to an address of an addressee, wherein each of the shipments of the group is an individual letter or package identified by an individual bar code on the letter or package, wherein all the shipments of the group have been shipped essentially at the same time, said method comprising:

tracking each of the shipments of the group by its individual bar code, wherein each of the individual bar codes comprises at least one part for identification of the shipper of the shipment, which is identical for all shipments of the group, and a shipment rank identification part of each shipment, which is variable for each of the shipments of the group, wherein the shipment rank identification part of the bar code of each of the shipments of the group is different from the shipment rank identification parts of the bar codes of each of the other shipments of the group.

2. The shipment tracking method according to claim 1, further comprising placing shipper information in a first database for shipper identification and identifying the shipper using this first database, and placing a list of shipper identification and shipment rank identification for each of the shipments of the group and corresponding shipment information in a second database and identifying each of the shipments of the group using this second database.

3. The shipment tracking method according to claim 1, further comprising prior to tracking of each shipment, registration in a data table of shipments being tracked of the shipment rank identification part of each of the shipments of the group and the shipper identification part.

4. The shipment tracking method according to claim 3, wherein the bar code further comprises a service option command part which is variable.

5. The shipment tracking method according to claim 4, further comprising prior to tracking of each shipment, registration in the data table of shipments being tracked of the service option command part.

6. The shipment tracking method according to claim 4, wherein the service option command part enables commanding transmission of a confirmation of receipt of the shipment.

7. The shipment tracking method according to claim 6, wherein transmission of a confirmation of receipt is implemented by at least one of (i) transmission of at least one written message and (ii) transmission of at least one electronic message on a receiver of a fixed or portable computer or cellular telephone connected to a telecommunication network.

8. The shipment tracking method according to claim 4, wherein the service option command part enables commanding transmission of a confirmation of drop off of the shipment.

9. The shipment tracking method according to claim 8, wherein transmission of a confirmation of drop off is implemented by at least one of (i) transmission of at least one written message and (ii) transmission of at least one electronic message on a receiver of a fixed or portable computer or cellular telephone connected to a telecommunication network.

10. The shipment tracking method according to claim 1, wherein the shipper identification part enables commanding transmission of a notification of erroneous address of the addressee.

11. The shipment tracking method according to claim 10, wherein the user is given a possibility to respond to the notification of erroneous address by providing a new address for the addressee.

12. The shipment tracking method according to claim 1, wherein the shipper identification part is registered by means of a database server accessible by authorized personnel.

13. The shipment tracking method according to claim 12, wherein the server automatically performs transmission of confirmation(s) of drop off or receipt, or notification of an erroneous address.

14. The shipment tracking method according to claim 1, further comprising reading said bar code at least upon dropping off the shipment with a delivery agent and upon receipt of the shipment by the addressee.

15. The shipment tracking method according to claim 1, wherein the shipment identification part, which is invariable for each shipper, is used to enable localization of a shipment deposit mailbox when said shipper is the addressee of a shipment implemented by another shipper.

16. The shipment tracking method according to claim 15, further comprising checking by reading said addressee shipper identification part prior to depositing the shipment, that the identification part identifying the mailbox is validly that of the addressee of said shipment.

17. The shipment tracking method according to claim 15, wherein confirmation of receipt transmitted to the shipper comprises at least a part of the address information of the addressee.

18. The shipment tracking method according to claim 15, wherein the addressee is informed of receipt of shipment in a mailbox for shipment deposits identified by an identification part which is exclusive to the shipper by transmission of at least one electronic message on a fixed or portable receiver or a cellular phone linked to a telecommunication network.

19. The shipment tracking method according to claim 1, further comprising a statistical tracking of the shipment and/or of the receipt of shipments by the shipper by means of said identification part.

* * * * *